US011526728B2

(12) United States Patent
Zhang et al.

(10) Patent No.: US 11,526,728 B2
(45) Date of Patent: Dec. 13, 2022

(54) DEEP LEARNING MODEL SCHEDULING

(71) Applicant: Microsoft Technology Licensing, LLC, Redmond, WA (US)

(72) Inventors: Minjia Zhang, Redmond, WA (US); Samyam Rajbhandari, Redmond, WA (US); Wenhan Wang, Redmond, WA (US); Yuxiong He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 927 days.

(21) Appl. No.: 16/018,784

(22) Filed: Jun. 26, 2018

(65) Prior Publication Data

US 2019/0311245 A1 Oct. 10, 2019

Related U.S. Application Data

(60) Provisional application No. 62/655,016, filed on Apr. 9, 2018.

(51) Int. Cl.
*G06F 17/16* (2006.01)
*G06N 3/04* (2006.01)
*G06N 3/08* (2006.01)
*G06N 3/063* (2006.01)

(52) U.S. Cl.
CPC .......... *G06N 3/0445* (2013.01); *G06F 17/16* (2013.01); *G06N 3/063* (2013.01); *G06N 3/08* (2013.01)

(58) Field of Classification Search
CPC ........ G06N 3/0445; G06N 3/063; G06N 3/08; G06F 17/16; G06F 8/457; G06F 8/49; G06F 9/3003; G06F 9/30047; G06F 9/3009; G06F 9/3017; G06F 9/50
See application file for complete search history.

(56) References Cited

U.S. PATENT DOCUMENTS

2019/0278593 A1* 9/2019 Elango .................... G06F 8/447
2021/0064997 A1* 3/2021 Lee ......................... G06N 3/063

OTHER PUBLICATIONS

Qingqing Cao and Niranjan Balasubramanian and Aruna Balasubramanian (2017). MobiRNN: Efficient Recurrent Neural Network Execution on Mobile GPU. CoRR, abs/1706.00878. (Year: 2017).*

(Continued)

*Primary Examiner* — Eric Nilsson
*Assistant Examiner* — Johnathan R Germick
(74) *Attorney, Agent, or Firm* — Schwegman Lundberg & Woessner, P.A.

(57) ABSTRACT

Systems, methods, and computer-executable instructions for determining a computation schedule for a recurrent neural network (RNN). A matrix multiplication (MM) directed-acyclic graph (DAG) is received for the RNN. Valid phased computation schedules for the RNN are generated. Each of the valid phase computation schedule includes an ordering of MM operations. For each of the plurality of valid phased computation schedules, each of the MM operations is partitioned to processor cores based on L3 cache to L2 cache data movement. The RNN is executed based on the valid phased computation schedules. A final computation schedule is stored. The final computation schedule is used for future executions of the RNN.

20 Claims, 9 Drawing Sheets

(56) References Cited

OTHER PUBLICATIONS

F. Yan, O. Ruwase, Y. He and E. Smirni, "SERF: Efficient Scheduling for Fast Deep Neural Network Serving via Judicious Parallelism," SC '16: Proceedings of the International Conference for High Performance Computing, Networking, Storage and Analysis, Salt Lake City, UT, USA, 2016, pp. 300-311, (Year: 2016) doi: 10.1109/SC.2016.25. (Year: 2016).*

Xuan Yang and Jing Pu and Blaine Burton Rister and Nikhil Bhagdikar and Stephen Richardson and Shahar Kvatinsky and Jonathan Ragan-Kelley and Ardavan Pedram and Mark Horowitz (2016). A Systematic Approach to Blocking Convolutional Neural Networks. CoRR, abs/1606.04209. (Year: 2016).*

Chen, Y.H., Emer, J., & Sze, V. (2016). Eyeriss: A Spatial Architecture for Energy-Efficient Dataflow for Convolutional Neural Networks. In Proceedings of the 43rd International Symposium on Computer Architecture (pp. 367-379). IEEE Press. (Year: 2016).*

Gao, M., Pu, J., Yang, X., Horowitz, M., & Kozyrakis, C. (2017). TETRIS: Scalable and Efficient Neural Network Acceleration with 3D Memory. In Proceedings of the Twenty-Second International Conference on Architectural Support for Programming Languages and Operating Systems (pp. 751-764). (Year: 2017) Association for Computing Machinery. (Year: 2017).*

Song Han and Junlong Kang and Huizi Mao and Yiming Hu and Xin Li and Yubin Li and Dongliang Xie and Hong Luo and Song Yao and Yu Wang and Huazhong Yang and William J. Dally (2016). ESE: Efficient Speech Recognition Engine with Compressed LSTM on FPGA. CoRR, abs/1612.00694. (Year: 2016).*

Johnson, Jesse. "Rolling and Unrolling Rnns." The Shape of Data, Apr. 28, 2016, https://shapeofdata.wordpress.com/2016/04/27/rolling-and-unrolling-rnns/. (Year: 2016).*

Neubig, G., et al. (2017). DyNet: The Dynamic Neural Network Toolkit. (Year: 2017).*

E. U. Munir, S. Mohsin, A. Hussain, M. W. Nisar and S. Ali, "SDBATS: A Novel Algorithm for Task Scheduling in Heterogeneous Computing Systems," 2013 IEEE International Symposium on Parallel & Distributed Processing, Workshops and Phd Forum, 2013, pp. 43-53, doi: 10.1109/IPDPSW.2013.259. (Year: 2013).*

M. Mehendale, G. Venkatesh and S. D. Sherlekar, "Optimized code generation of multiplication-free linear transforms," 33rd Design Automation Conference Proceedings, 1996, 1996, pp. 41-46, doi: 10.1109/DAC.1996.545542. (Year: 1996).*

"Eigen C++ Library for Linear Algebra", Retrieved from: http://eigen.tuxfamily.org/. Retrieved on: Mar. 28, 2018, 12 Pages.

"Intel Math Kernel Library (Intel MKL)", Retrieved from: https://software.intel.com/en-us/mkl, Retrieved on: Mar. 28, 2018, 4 Pages.

"Intel VTune Amplifier", Retrieved from: https://software.intel.com/en-us/intel-vtune-amplifier-xe. Retrieved on: Mar. 28, 2018, 4 Pages.

"NVIDIA TensorRT", Retrieved from: https://developer.nvidla.com/tensorrt, Retrieved on: Mar. 28, 2018, 5 Pages.

"OpenBLAS", Retrieved from: http://www.openbias.net/, Retrieved on: Mar. 28, 2018, 2 Pages.

"Recurrent Neural Networks Tutorial", Retrieved from: http://www.wildml.com/2015/09/, Sep. 30, 2015, 3 Pages.

"SQuAD: The Stanford Queson Answering Datase", Retrieved from: https://rajpurkar.glihub.io/SQuAD-explorer/, Retrieved on: Mar. 28, 2018, 9 Pages.

"STREAM Benchmark Reference Information", Retrieved from: http://www.cs.virginia.edu/stream/ref.html, Retrieved on: Mar. 28, 2018, 7 Pages.

"TensorFlow", Retrieved from: https://web.archive.org/web/20170817170520/https:/www.tensortlow.org/serving/, Aug. 17, 2017, 2 Pages.

"Understanding LSTM Networks", Retrieved from: http://colah.github.io/posts/2015-08-Understanding-LSTMs/, Aug. 27, 2015, 8 Pages.

"XLA Overview", Retrieved from: https:/www.tensorflow.org/performance/xla/, Retrieved on: Mar. 28, 2018, 4 Pages.

Abadi, et al., "TensorFlow: A System for Large-scale Machine Learning", In Proceedings of the 12th USENIX Symposium on Operating Systems Design and Implementation, Nov. 2, 2016, pp. 265-283.

Appleyard, et al., "Optimizing Performance of Recurrent Neural Networks on GPUs", In Journal of the Computing Research Repository, Apr. 7, 2016, pp. 1-9.

Bahdanau, et al., "Neural Machine Translation by Jointly Learning to Align and Translate", In Journal of the Computing Research Repository, Sep. 1, 2014, pp. 1-15.

Bengio, et al., "A Neural Probabilistic Language Model", In Journal of Machine Learning Research, vol. 3, Feb. 2003, 19 Pages.

Bergstra, et al., "Theano: A CPU and GPU Math Compiler in Python", In Proceedings of the 9th Python in Science Conference, Jun. 2010, pp. 1-7.

Chen, et al., "A Thorough Examination of the CNN/Daily Mail Reading Comprehension Task", In Proceedings ofthe 54th Annual Meeting ofthe Association for Computational Linguistics, Aug. 7, 2016, pp. 2358-2367.

Chen, et al., "MXNet: A Flexible and Efficient Machine Learning Library for Heterogeneous Distributed Systems", In Journal of the Computing Research Repository, Dec. 3, 2015, pp. 1-6.

Chetlur, et al., "CuDNN: Efficient Primitives for Deep Learning", In Journal of the Computing Research Repository, Oct. 3, 2014, pp. 1-9.

Cho, et al., "Learning Phrase Representations using RNN Encoder-Decoder for Statistical Machine Translation", In Proceedings of the Conference on Empirical Methods in Natural Language Processing, Jun. 3, 2014, 14 Pages.

Chung, et al., "Empirical Evaluation of Gated Recurrent Neural Networks on Sequence Modeling", In Journal of the Computing Research Repository, Dec. 11, 2014, pp. 1-9.

Crankshaw, "Cilpper: A Low-Latency Online Prediction Serving System", In Proceedings of 14th USENIX Symposium on Networked Systems Design and Implementation, Mar. 27, 2017, pp. 613-627.

Dagum, et al., "OpenMP: An Industry—Standard API for Shared-Memory Programming", In Journal of IEEE Computational Science and Engineering, vol. 5, issue 1, Jan. 1998, pp. 46-55.

Dhingra, et al., "Gated-Attention Readers for Text Comprehension", In Proceedings of the 55th Annual Meeting of the Association for Computational Linguistics, Jul. 30, 2017, 15 Pages.

Diamos, et al., "Persistent RNNs: Stashing Recurrent Weights On-Chip", In Proceedings of the 33rd International Conference on Machine Learning, vol. 48, Jun. 11, 2016, 10 Pages.

Dubtsov, et al., "Intel(R) Math Kernel Library for Deep Neural Networks", Retrieved from: https://web.archive.org/web/20180717132532/https://github.com/intel/mkl-dnn, Jul. 17, 2018, 5 Pages.

Flach, et al., "Reducing Web Latency: The Virtue of Gentle Aggression", In Proceedings of the ACM Conference of the Special Interest Group on Data Communication, Aug. 12, 2013, pp. 153-170.

Zhang, et al., "DeepCPU: Serving RNN-based Deep Learning Models 10x Faster", In Proceedings of the USENIX Annual Technical Conference, Jul. 11, 2018, pp. 951-965.

Goto, et al., "Anatomy of Highperformance Matrix Multiplication", In Proceedings of ACM Transactions on Mathematical Software, vol. 34, Issue 3,, May 2008, 25 Pages.

Graves, et al., "Speech Recognition with Deep Recurrent Neural Networks", In Proceedings of IEEE International Conference on Acoustics, Speech and Signal Processing, May 26, 2013, pp. 6645-6643.

"RNNLIB", Retrieved from: https://github.com/szcom/rnnlib. Retrieved on: Mar. 28, 2018, 3 Pages.

Han, et al., "Deep Compression: Compressing Deep Neural Networks with Pruning, Trained Quantization and Huffman Coding", In Journal of the Computing Research Repository, Oct. 2015, pp. 1-11.

Han, et al., "EIE: Efficient Inference Engine on Compressed Deep Neural Network", In Proceedings ofthe 43rd International Symposium on Computer Architecture, Jun. 18, 2016, pp. 243-254.

Hannun, et al., "Deep Speech: Scaling up end-to-end speech recognition", In Journal ofthe Computing Research Repository, Dec. 17, 2014, pp. 1-12.

(56) References Cited

OTHER PUBLICATIONS

Hochreiter, et al., "Long Short-Term Memory", In Journal of Neural Computation, vol. 9, Issue 8, Nov. 15, 1997, pp. 1735-1780.
Hubara, et al., "Binarized Neural Networks", In Proceedings of 30th Conference on Neural Information Processing Systems, Feb. 8, 2016, pp. 1-9.
Jia, et al., "Caffe: Convolutional Architecture for Fast Feature Embedding", In Proceedings of the 22nd ACM International Conference on Multimedia, Nov. 3, 2014, pp. 675-678.
Jouppi, et al., "In-Datacenter Performance Analysis of a Tensor Processing Unit", In Proceedings of the 44th Annual International Symposium on Computer Architecture, Jun. 24, 2017, pp. 1-12.
Kadlec, et al., "Text Understanding with the Attention Sum Reader Network", In Proceedings of the 54th Annual Meeting of the Association for Computational Linguistics, Aug. 7, 2016, pp. 908-918.
Leonard, et al., "Rnn : Recurrent Library for Torch", In Journal of Computing Research Repository, Nov. 24, 2015, pp. 1-11.
Li, et al., "FPGA Acceleration of Recurrent Neural Network Based Language Model", In Proceedings of the 23rd IEEE Annual International Symposium on Field-Programmable Custom Computing Machines, May 2, 2015, 8 Pages.
Masliah, et al., "High-Performance Matrix-Matrix Multiplications of Very Small Matrices", In Proceedings of 22nd International Conference on Parallel and Distributed Computing, Aug. 24, 2016, 21 Pages.
Mikolov, et al., "Linguistic Regularities in Continuous Space Word Representations", In Proceedings of the Conference of the North American Chapter of the Association for Computational Linguistics: Human Language Technologies, Jun. 9, 2013, pp. 746-751.
Mikolov, et al., "Recurrent Neural Network Based Language Model", In Proceedings of 11th Annual Conference of the International Speech Communication Association, Sep. 26, 2010, pp. 1045-1048.
Nurvitadhi, et al., "Accelerating recurrent neural networks in analytics servers: Comparison of FPGA, CPU, GPU, and ASIC", In Proceedings of 26th International Conference on Field Programmable Logic and Applications, Aug. 29, 2016, 4 Pages.
Palkar, et al., "Weld: A common runtime for high performance data analytics", In Proceedings of 8th Biennial Conference on Innovative Data Systems Research, Jan. 8, 2017, 8 Pages.
Ragan-Kelley, et al., "Halide: A Language and Compiler for Optimizing Parallelism, Locality, and Recomputation in Image Processing Pipelines", In Proceedings of the 34th ACM SIGPLAN Conference on Programming Language Design and Implementation, Jun. 16, 2013, pp. 519-530.
Rajbhandari, et al., "Optimizing CNNs on Multicores for Scalability, Performance and Goodput", In Proceedings of the Twenty-Second International Conference on Architectural Support for Programming Languages and Operating Systems, Apr. 8, 2017, pp. 267-280.
Salehinejad, et al., "Recent Advances in Recurrent Neural Networks", In Journal of the Computing Research Repository, Jan. 2018, pp. 1-21.
Seide, et al., "CNTK: Microsoft's Open-Source Deep-Learning Toolkit", In Proceedings of the 22nd ACM SIGKDD International Conference on Knowledge Discovery and Data Mining, Aug. 13, 2016, pp. 2135-2135.
Seo, et al., "Bidirectional Attention Flow for Machine Comprehension", In Journal of the Computing Research Repository, Nov. 2016, pp. 1-12.
Sharma, et al., "From High-Level Deep Neural Models to FPGAs.", In Proceedings of the 49th Annual IEEE/ACM International Symposium on Microarchitecture, Oct. 15, 2016, 12 Pages.
Shi, et al., "Benchmarking State-of-the-Art Deep Learning Software Tools", In Proceedings of 7th International Conference Cloud Computing Big Data, Nov. 16, 2016, 99-104.
Spampinato, et al., "A Basic Linear Algebra Compiler", In Proceedings of Annual IEEE/ACM International Symposium on Code Generation and Optimization, Feb. 15, 2014, pp. 23-32.
Sutskever, et al., "Sequence to Sequence Learning with Neural Networks", In Proceedings of Advances in Neural Information Processing Systems, Dec. 8, 2014, pp. 1-9.
Vanhoucke, et al.; "Improving the speed of neural networks on CPUs", In Proceedings of Deep Learning and Unsupervised Feature Learning, Dec. 2011, pp. 1-8.
Vinyals, et al., "A Neural Conversational Model", In Journal of the Computing Research Repository, Jun. 19, 2015, 7 Pages.
Wen, et al., "Learning Intrinsic Sparse Structures within Long Shod-term Memory", In Journal of the Computing Research Repository, Sep. 2017, pp. 1-10.
Weninger, et al., "Introducing CURRENNT: The Munich Opensource Cuba Recurrent Neural Network Tookit", In Journal of Machine Learning Research; vol. 16 , Issue 1, Mar. 2015, pp. 547-551.
Williams, et al., "Roofline: An Insightful Visual Performance Model for Multicore Architectures", In Journal of Communications of the ACM, vol. 52, Issue 4, Apr. 2009, pp. 1-14.
Zweig, et al., "Advances in all-neural speech recognition", In Proceedings of IEEE International Conference on Acoustics, Speech and Signal Processing, Mar. 5, 2017, 4805-4809.

* cited by examiner

DEEP LEARNING MODEL SCHEDULING

PRIORITY CLAIM

This application claims the benefit of priority to U.S. Provisional Patent Application Ser. No. 62/655,016, filed Apr. 9, 2018, and entitled "DEEP LEARNING MODEL SCHEDULING". The above-identified provisional application is incorporated herein by reference in its entirety.

BACKGROUND

Deep learning (DL) is a fast-growing field influencing many applications on image, speech, and text processing. Traditional feed forward neural networks assume that all inputs (and outputs) are independent of each other. This assumption may not be valid for many tasks. For example, to predict the next word in a sentence, which words come before the current word are useful. Recurrent neural networks (RNNs) are an important and popular class of DL models that address the independent input/output assumption by making use of sequential information. RNNs perform the same task for every element in the sequence, with the output being dependent on the previous computation. RNNs have shown great promise in many natural language processing tasks, e.g., language models, machine translation, machine reading comprehension, speech recognition, and conversational bots.

Using RNNs typically has two steps: (1) learning model weights through training, and (2) applying the model to predict the results of new requests, which is referred to as serving, or equivalently, inferencing or scoring. Training is a throughput-oriented task: existing systems batch the computation of multiple training inputs to obtain massive parallelism, leveraging a graphics processing units (GPUs) to obtain high throughput. Users can often tolerate fairly long training time of hours and days because training is done offline. Serving, on the other hand, may make online prediction of incoming requests, imposing different goals and unique challenges.

Latency and efficiency are two important metrics for analyzing the serving of RNN models. Interactive services often require responses to be returned within a few or tens of milliseconds because delayed responses may degrade user satisfaction. Moreover, large-scale services handle massive request volumes and could require thousands of machines to serve a single model. Many RNN models from production services such as web search, advertisement, and conversational bots require intensive computation and may not be viable because of serving latency violation and cost constraints.

DETAILED DESCRIPTION

Figure 1A:
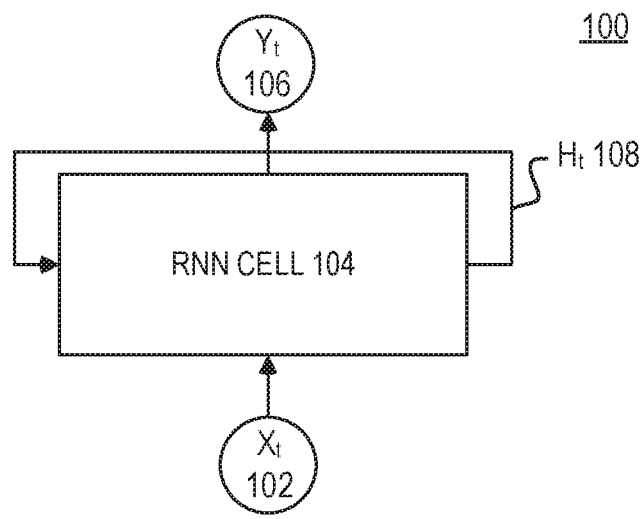
FIG. 1A shows an RNN with a recurrent structure.

Running a DL model without optimization may require a substantial amount of resources or time to complete such that the DL model is not suitable for real-time or online use. Various described embodiments partition a DL model to increase computation resource usage through parallelization. In addition, reusing data effectively may significantly increase the efficiency of running a DL model. In various embodiments, data is reused across a sequence of calculations. In addition, data movement between different caches is reduced to decrease the computation time for running a DL model. For example, data may be sized to fit within a faster cache, moved into the faster cache, and then the data may be reused across a sequence of calculations without being removed from the faster cache. In this manner, the described techniques achieve a variety of technical advantages including, but not limited to, decreasing DL model runtimes, conserving memory when a DL model runs, and reducing processor load.

RNN performance on known DL frameworks exhibit poor utilization of available computational resources. For example, existing frameworks often use less than 2% of hardware abilities when serving RNNs. This may be due to the intrinsically challenging workload of an RNN. Due to stringent latency service level agreements (SLA), online RNN serving systems often process each request upon the request's arrival, or at best, batch a few requests whenever possible. With a batch size of one or a few requests, the computation is dominated by several vector-matrix multiplications (or matrix multiplications), that have poor data reuse and thus are bottlenecked on cache/memory bandwidth. Since the speed of data transfer is far slower than the computational speed of CPUs, processing cores may be left waiting for data instead of conducting useful computation. Processing cores that are waiting may lead to poor performance and latency.

A second issue is that existing DL frameworks often rely on parallel-GEMM (GEneral Matrix to Matrix Multiplication) implementations which are not targeted to optimize the type of matrix multiplications (MMs) in RNN computations. Parallel-GEMM is designed to optimize large MMs with high data reuse by hiding the data movement cost with ample computation. MMs in RNNs are usually much smaller, fitting entirely in shared L3 cache, but with minimal data reuse: data movement from shared L3 cache to private L2 cache is the main bottleneck. Due to limited data reuse, parallel-GEMM can no longer hide the data movement, requiring different considerations and new techniques. Furthermore, as weights are repeatedly used at MMs of each step along a sequence, there is a potential reuse opportunity from RNN domain knowledge, which parallel-GEMM does not exploit.

Various embodiments improve the speed of serving an RNN based on a search strategy to optimize data reuse. For example, private-cache-aware partitioning may be used that provides a method to optimize the data movement between the shared L3 cache to private L2 cache. In addition, a weight-centric streamlining that moves computation to where weights are stored to maximize data reuse across multiple steps of RNN execution may also be used. These techniques help overcome the limitation of directly applying parallel-GEMM and optimize data reuse on multicore systems. In addition, embodiments may use MM fusion and reuse-aware parallelism decision to further increase the performance of serving an RNN.

To accomplish this, RNN computation may be modeled using a Directed Acyclic Graph of Matrix Multiplication nodes (MM-DAG) which supports a rich set of optimization options such as partitioning (splitting a node) and fusion (merging nodes). The traditional DAG scheduling problem of minimizing execution time by deciding the execution order of the nodes is known to be an NP-hard problem even in the absence of additional options. The optimization options further enlarge the search space exponentially, and therefore exhaustively enumerating all schedules is not feasible. Accordingly, various embodiments use a search strategy that requires far fewer calibration runs.

In various embodiments, data reuse is accomplished over a sequence of computations. The sequence of computations is part of how RNNs are implemented. FIG. 1A shows an RNN 100 with a recurrent structure. An RNN models the relationships along a sequence by tracking states between the model's steps. At each step t, an RNN cell 104 takes a unit of input $x_t$ 102, e.g., a token in a text, or a phoneme in a speech stream, and makes a prediction $y_t$ 106 based on both the current input $x_t$ 102 and the previous hidden (or cell) state $h_t$ 108. The hidden states $h_t$ 108 form a loop, allowing information to be passed from one step to the next. The block of computation per step is called an RNN cell 104, and the same cell computation is used for all inputs of the sequence.

Figure 1B:
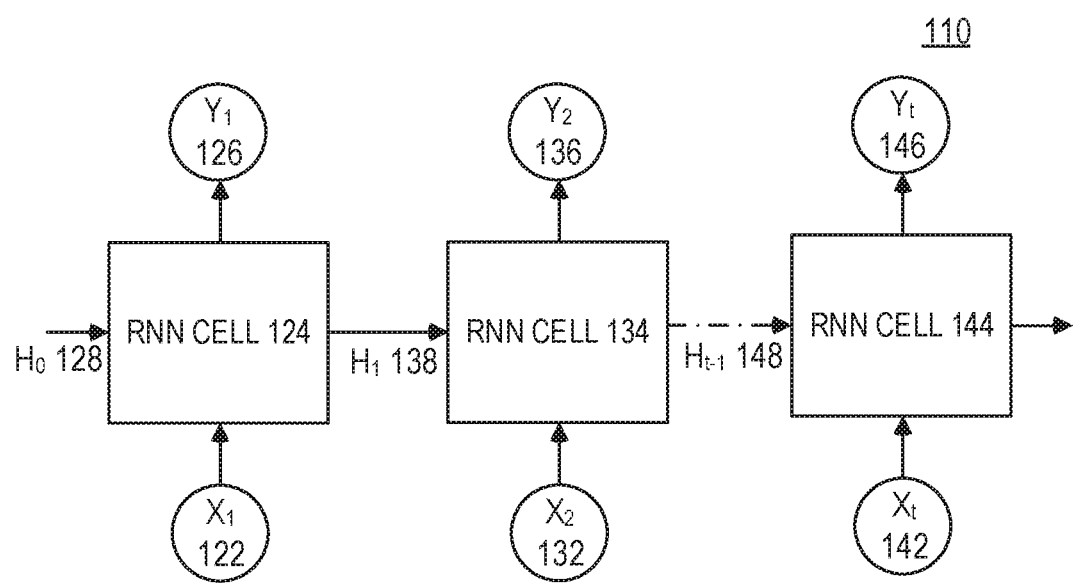
FIG. 1B shows an RNN with a recurrent structure unrolled.

An RNN (sequence) computation can be viewed as an unrolled chain of cells. FIG. 1B shows an unrolled RNN 110. The RNN 110 includes t number of steps/RNN cells 124, 134, and 144. A hidden state 128, 138, and 148 is passed to each of the RNN cells 124, 134, and 144. The hidden state 128, 138, and 148 may be based on the previous RNN cell and thus the hidden state 128, 138, and 148 may be different for each RNN cell 124, 134, and 144. At each step, an input 122, 132, and 142 is used to calculate a prediction 126, 136, and 146. The difference between FIG. 1A and FIG. 1B is that FIG. 1B shows the loop from FIG. 1A expanded/unrolled.

There are many variations of RNNs, inheriting the recurrent structure as shown in FIGS. 1A and 1B but using different cell computations. Two such RNN variations are Long Short Term Memory (LSTM) and Gated Recurrent Unit (GRU) network, best known for effectively catching long-term dependencies along sequences. Below is an example of LSTM cell computation:

$i_t = \sigma(W_i \cdot x_t + U_i \cdot h_{t-1} + b_i)$ $f_t = \sigma(W_f \cdot x_t + U_f \cdot h_{t-1} + b_f)$ $o_t = \sigma(W_o \cdot x_t + U_o \cdot h_{t-1} + b_o)$ $c_t = f_t \circ c_{t-1} + i_t \circ \tan h(W_c \cdot x_t + U_c \cdot h_{t-1} + b_c)$ $h_t = o_t \circ \tan h(c_t).$ Here $\sigma(\cdot)$ denotes the sigmoid function. The sigmoid function is known to facilitate learning. The above equations focus on describing the main computations. LSTM may include four input MMs, which multiply input vector $x_t$ with four input weight matrices $W_{\{i,f,o,c\}}$ of size E×H. E is denoted as the input dimension of the input vector $x_t$, and H as the hidden dimension of the hidden vector $h_t$. LSTM may also include four hidden MMs, which multiply hidden vector $h_{t-1}$ with four hidden weight matrices $U_{\{i,f,o,c\}}$ of size H×H each. Within each cell, there is no dependency among the eight MMs, and across cells, the hidden state of step t depends on step t−1. LSTM may also include a few element-wise additions (+) and products (○), as well as activation functions such as $\sigma$ and tan h. Similar to the LSTM cell, GRU cell has six instead of eight MMs but with additional dependencies within them.

To make real-time predictions, online requests are often processed one at a time, or occasionally, a small number of requests may be batched together. Given a batch size of B, the batched input $x_t$ can be represented as a matrix of size B×E, which transforms the underlying computation from vector-matrix to matrix-matrix multiplications, exposing more opportunities for data reuse. However, because of tight latency requirements and spontaneous request arrivals, the batch size at serving is usually much smaller (e.g., 1 to 10) than the large mini-batch size (often hundreds) during training.

Known DL frameworks fail to fully utilize available computational resources. In analyzing the performance of known DL frameworks, the total amount of computation serving an RNN model is dominated by MMs. Typically, the total number of operations in MMs is two to three orders of magnitude larger than the rest of the operations combined. As such, RNN performance primarily depends on the MMs.

One reason that known DL frameworks only use a small fraction, e.g., 2%, of available computations resources is due to poor data reuse. Data reuse at a particular level of memory hierarchy is a measure of the number of computational operations that can be executed per data load/store at that level of memory hierarchy. Assuming a complete overlap between computation and data movement (best case scenario), the execution time of a computation can be estimated as a function of the data reuse using the roofline model as:

$$\text{Time} \geq \text{Max}(DataMoveTime, CompTime) =$$
$$\text{Max}\left(\frac{DataMoved}{DataBandwidth}, \frac{TotalComp}{Peak}\right) =$$
$$\text{Max}\left(\frac{TotalComp/Reuse}{DataBandwidth}, \frac{TotalComp}{Peak}\right)$$

Based on the above execution time, poor data reuse results in poor performance because on modern architectures the computational throughput is significantly higher than the data movement throughput. L3 to L2 bandwidth provide an example since all RNN models investigated fit in the L3 cache of modern CPUs. The peak computational performance of a Xeon E5-2650 machine is 1.69 Tflops (floating-point operations per second) while the observable Data-Bandwidth between L3 and L2 cache on this machine is 62.5 GigaFloats/s (250 GB/s), measured using the stream benchmark. If the reuse is low, the total execution time is dominated by the data movement, resulting in poor performance.

This is indeed the case for RNN in a serving scenario where the batch size tends to be very small. To see this, consider an MM:C[i, j]=$\Sigma_k$ A[i, k]×B[k, j]. Assuming that both the inputs and the outputs reside in the L3 cache at the beginning of the computation, then both the inputs and the outputs are read from the L3 cache to the L2 cache at least once, and the outputs are stored from the L2 cache to the L3 cache at least once during the MM. Therefore, the maximum possible data reuse during this MM from the L2 cache is given by $$\frac{2 \times I \times J \times K}{|A| + |B| + 2|C|},$$

where I, J and K are the size of indices i, j, and k. Similarly, the fused MM of LSTM has the shape [B,E+H]×[E+H,4H], and the data reuse is $$MaxDataReuse = \frac{8 \times B \times H \times (E+H)}{|Input| + |Weights| + 2|Output|} = \frac{8 \times B \times H \times (E+H)}{B \times (E+H) + 4 \times (E+H) \times H + 8 \times B \times H}$$

When batch size B<<min(H, E), the maximum data reuse from above reduces to 2B. With B=1 as an example, the best achievable performance of LSTM on the Xeon E5-2650 machine is at most 125 Gflops based on the measured L3 bandwidth of 250 GB/s. This result is less than 8% percent of the machine's peak of 1.69 Tflops.

Another reason that known DL frameworks only use a small fraction of computational power is due to sub-optimal MM partitioning. Parallel-GEMM libraries are designed to optimize performance of large MMs that have significant data reuse (>1000). These libraries exploit this reuse from the L2 cache level using loop-tiling to hide the data movement cost from both memory and the L3 cache. In contrast, the amount of reuse in RNNs is in the order of B, which is often a small value between 1 and 10 for most serving cases. This low B value is not enough to hide the data movement cost even though MMs in RNN are small enough to fit in L3 cache. In the absence of large reuse, the performance of parallel-GEMM is limited by the data movement cost between the shared L3 cache and the private L2 caches. Parallel-GEMM is sub-optimal at minimizing this data movement.

More specifically, the L3 cache on a modern CPU feeds to multiple L2 caches that are private to each core. During RNN computations, some data might be required by multiple cores, causing multiple transfers of the same piece of data from L3 cache to different L2 caches. Thus, the total data movement between L3 and L2 caches depends on the partitioning of the MM computation space and its mapping to the cores. For example, if an MM computation is split among two cores, such that the first core computes the upper half of the output matrix C, while the second core computes the lower half, then input matrix B is replicated on the L2 cache of both cores, as the entire matrix B is required to compute both halves of matrix C. Alternatively, if the computation is split horizontally, then the input matrix A is replicated on the L2 cache of both cores. Different partitionings clearly result in different amount of data reuse. Parallel-GEMM does not always produce a partitioning that maximizes this data reuse. Libraries specialized for small matrices are not sufficient either, as some focus only on sequential execution while others focus on MMs that are small enough to fit in L1 cache.

Another reason for poor performance of known libraries is based on data not being reused across the sequence. During serving, weight matrices of RNNs remain the same across the sequence, but existing solutions do not take advantage of this to optimize data reuse. More precisely, parallel-GEMM used to execute the MMs is not aware of this reuse across the sequence. During each step of the sequence, the weight matrix could be loaded from the L3 cache to the L2 cache. However, various embodiments improve performance of RNNs by exploiting this data reuse.

Figure 2:
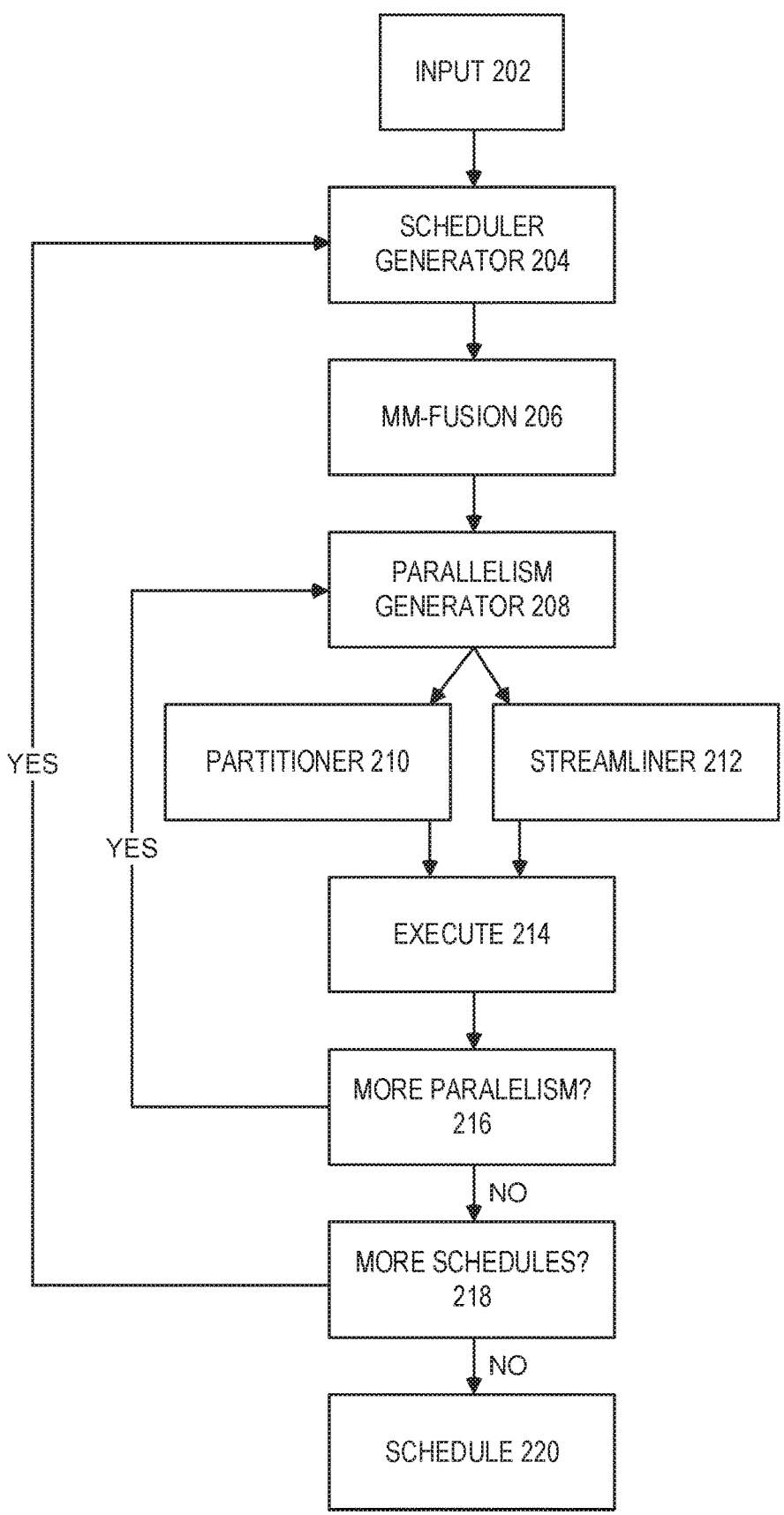
FIG. 2 is a block diagram of a system for schedule determination in accordance with respective examples.

FIG. 2 is a block diagram of a system 200 for schedule determination in accordance with respective examples. The system 200 includes features that address the poor performance of known DL frameworks. As noted above, the scheduling problem of minimizing execution time by deciding the execution order of nodes is known to be an NP-hard problem. Accordingly, an important start of the scheduling optimization is to define a concise search space. The most performance critical operators, MMs, are identified and the computation graph connecting the MMS are modeled to capture the first-order impact. In an example, this is done by constructing a Matrix Multiplication Directed Acyclic Graphs (MM-DAG) to represent the RNN computation, where each node represents an MM and edges represent dependencies among them. MM-DAG allows schedules to be built using MMs as the basic building blocks, capturing key computations while abstracting away other low-level details. Instead of examining all valid schedules for the MM-DAG the iterative nature and other properties of RNNs can be leveraged to prune search space to deduplicate the performance-equivalent schedules, and remove those schedules that cannot be optimal.

The system 200 starts with input 202 that models RNN computation. In an example, the input 202 may be a MM-DAG of an RNN. A scheduler generator 204 generates a schedule of execution for the RNN. The scheduler generator 204 may prune the search space to take advantage of the iterative nature of the RNN. The scheduler generator 204 may also remove schedules that cannot be optimal based on previous calculations.

Each schedule may then have one or more various techniques that boost data locality for RNNs. MM-fusion 206 analyzes MM within an RNN and fuses smaller MMs into larger ones, thus improving data reuse. A parallelism generator 208 identifies a best parallelism degree within and across MMs through auto-tuning and considering locality. A partitioner 210 may optimize the total data movement between the shared L3 cache and private L2 caches of the processing cores. In an example, the function of the partitioner 210 may be referred to as a private-cache-aware-partitioning (PCP). A streamliner 212 maps partitions produced by the partitioner 210 to cores in a way that enables reuse of weights across the sequence. The function of the streamliner 212 may be referred to as weight centric streamlining (WCS). The items in FIG. 2 are described in greater detail below.

In an example, the parallelism generator 208 iterates over different choices on parallelism degrees. For a parallelism choice, the partitioner 210 is used to obtain locality optimized parallel partitions. The partitions are then mapped to cores using the streamliner 212 to create an updated schedule. In an example, individual partitions are implemented using highly optimized single-threaded BLAS library which optimizes for low-level hardware resources such as L1 cache and SIMD instruction set. The schedule is then executed 214 to obtain the execution time, and loop over to find the best parallelism choice. Once this process is completed for all schedules 218 generated by the scheduler generator 204, the schedule 220 that is the fastest is selected. This calibration process may be called once during model construction, and then the optimized schedule 220 is repeatedly used for serving user requests of the model.

In various embodiments, analytical performance analysis (at search space pruning and PCP) is combined with empirical calibration (to measure the combined impact of locality and parallelism). The former effectively reduces the search space, saving tuning time to run many suboptimal/redundant schedules. The latter reliably measures the actual execution time to capture complex software and hardware interaction, which cannot be accurately estimated. This combination empowers both effectiveness and efficiency.

As noted above, RNN computations may be modeled as MM-DAGs. The schedules to execute an MM-DAG may then be optimized. Given an MM-DAG, a valid schedule determines an execution ordering of its nodes that satisfies all the dependencies. This may be done by the scheduler generator 204. Only those valid schedules that are composed of phases are considered. A phased schedule executes an MM-DAG in a sequence of phases $S_1, S_2, S_3, \ldots, S_i, \ldots$, where each phase $S_i$ may represent a non-overlapping subset of nodes and $S=\Sigma_i\ S_i$ consists of all nodes. There is a total ordering between phases such that if $i<j$, then all nodes in $S_i$ are executed before $S_j$. However, nodes within a phase can be executed in parallel. TABLE 1 shows two examples of valid phased schedules for LSTM. In Schedule 1, all MMs at a timestep t are in Phase t.

The phases can be divided into two categories: i) If a phase consists of an MM that has dependency across the timesteps, this is called a time-dependent phase, e.g., those MMs taking hidden state $h_t$ as inputs, ii) Otherwise, if a phase does not contain any MM that has dependency across the sequence, this is called a time-independent phase. For example, in Schedule 2 of TABLE 1, Phase 1 is time-independent, and consists of all the MMs computing input transformation (with weights $W_i$, $W_f$, $W_c$ and $W_o$) across all timesteps; all other phases are time-dependent, requiring the value of $h_{t-1}$ to compute $h_t$.

TABLE 1

// Phased LSTM Schedule 1
for t:
    Phase t: // time - dependent
        $W_i \cdot x_t, W_f \cdot x_t, W_c \cdot x_t, W_o \cdot x_t$
        $U_i \cdot h_{t-1}, U_f \cdot h_{t-1}, U_c \cdot h_{t-1}, U_o \cdot h_{t-1}$
// Phased LSTM Schedule 2
Phase 1: // time - independent
    $W_i \cdot x_0, \ldots, W_i \cdot x_t, W_f \cdot x_0, \ldots, W_f \cdot x_t$
    $W_c \cdot x_0, \ldots, W_c \cdot x_t, W_o \cdot x_0, \ldots, W_o \cdot x_t$
for t:
    Phase (t+1): // time - dependent
        $U_i \cdot h_{t-1}, U_f \cdot h_{t-1}, U_c \cdot h_{t-1}, U_o \cdot h_{t-1}$ The scheduler generator 204 reduces the search space of schedules that will be considered. In various embodiments, one or more of the following three rules may be used to prune the search space by removing sub-optimal and redundant schedules. Time-dependent phases have symmetry across timesteps. As RNN computation is identical across timesteps, the fastest schedule for executing each timestep should also be identical. If two consecutive phases are of the same type, then there is a dependency between the two phases. If no dependency exists then this schedule is equivalent to another schedule where a single phase consists all MMs in both phases. Time-independent phases are computed before all dependent ones, as shown in Schedule 2 of TABLE 1. Having phases of the same type in consecutive order increases reuse of weights. If a schedule does not meet any one of these rules, then that scheduled may be pruned from the search space.

The MM-fusion 206 may fuse some or all possible MMs within each phase. Two MMs can be fused into a single MM if they share a common input matrix. Two MMs may be fused in various ways. As an example, consider two MMs, MM1: $C1[i1,j1]=\Sigma_{k1}\ A1[i1, k1]\times B1[k1,j1]$ and MM2:$C2[i2, j2]=\Sigma_{k2}\ A2[i2, k2]\times B2[k2, j2]$. Without loss of generality assume $A1[i1, k1]=A2[i1, k1]$, as shared input matrix. The two MMs can be fused into a single one MM12 by concatenating B1 and B2, and C1 and C2 along the column, i.e., $C12[i1,j12]=\Sigma_{k1}\ A1[i1, k1]\ B12[k1,j12]$ where $B12[k1,j1]=B1[k1,j1]$, $B12[k2, J1+j2]=B2[k2,j2]$, and $C12[i1,j1]=C1[i1,j1]$, $C12[i2, J1+j2]=C2[i2,j2]$ (J1 is the size of index j1).

Fusion also improves data reuse. Consider using any GEMM implementation to execute MM1 and MM2 without fusion. While both MM1 and MM2 share a common input, GEMM is not aware of this reuse and could not take advantage of it. However, if MM1 and MM2 are fused, this reuse is explicit in the MM and GEMM can exploit the fusion to improve both performance and scalability.

Figure 3A:
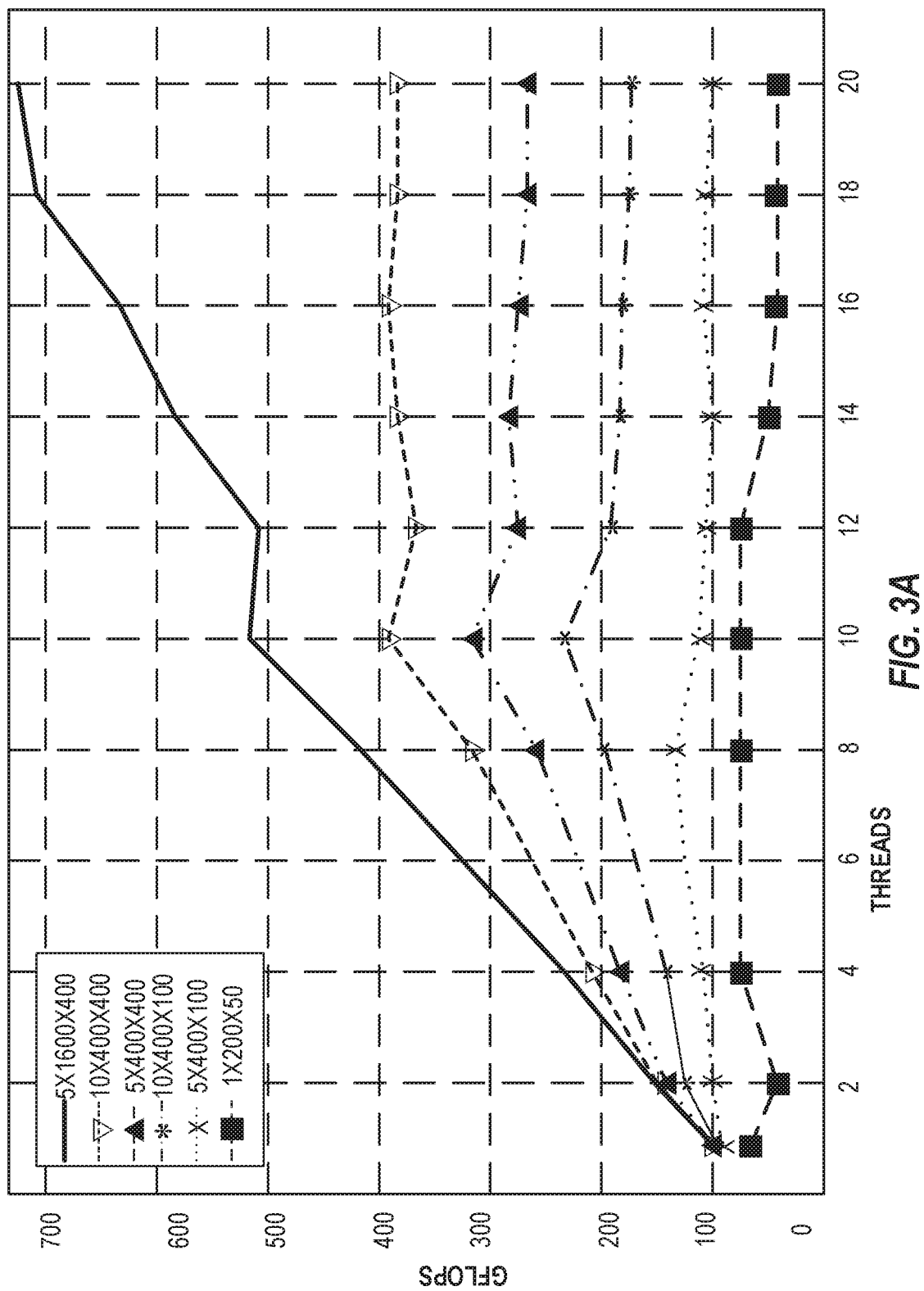
FIG. 3A is a graph of performance with increasing degrees of parallelism in accordance with respective examples.

Parallelism boosts compute capacity but may also increases data movement. Executing an MM with the maximum available parallelism may not always be the best option for performance. As the parallelism increases, either the input or output is replicated across multiple L2 private caches, thus increasing the total data movement. Once the level of parallelism reaches a certain threshold, the performance is limited by the data movement instead of the computational throughput. As shown in FIG. 3A, the MM performance degrades after certain parallelism, e.g., around 10 threads. In various embodiments, the optimal level of parallelism is determined and used instead of using all available cores.

Figure 3B:
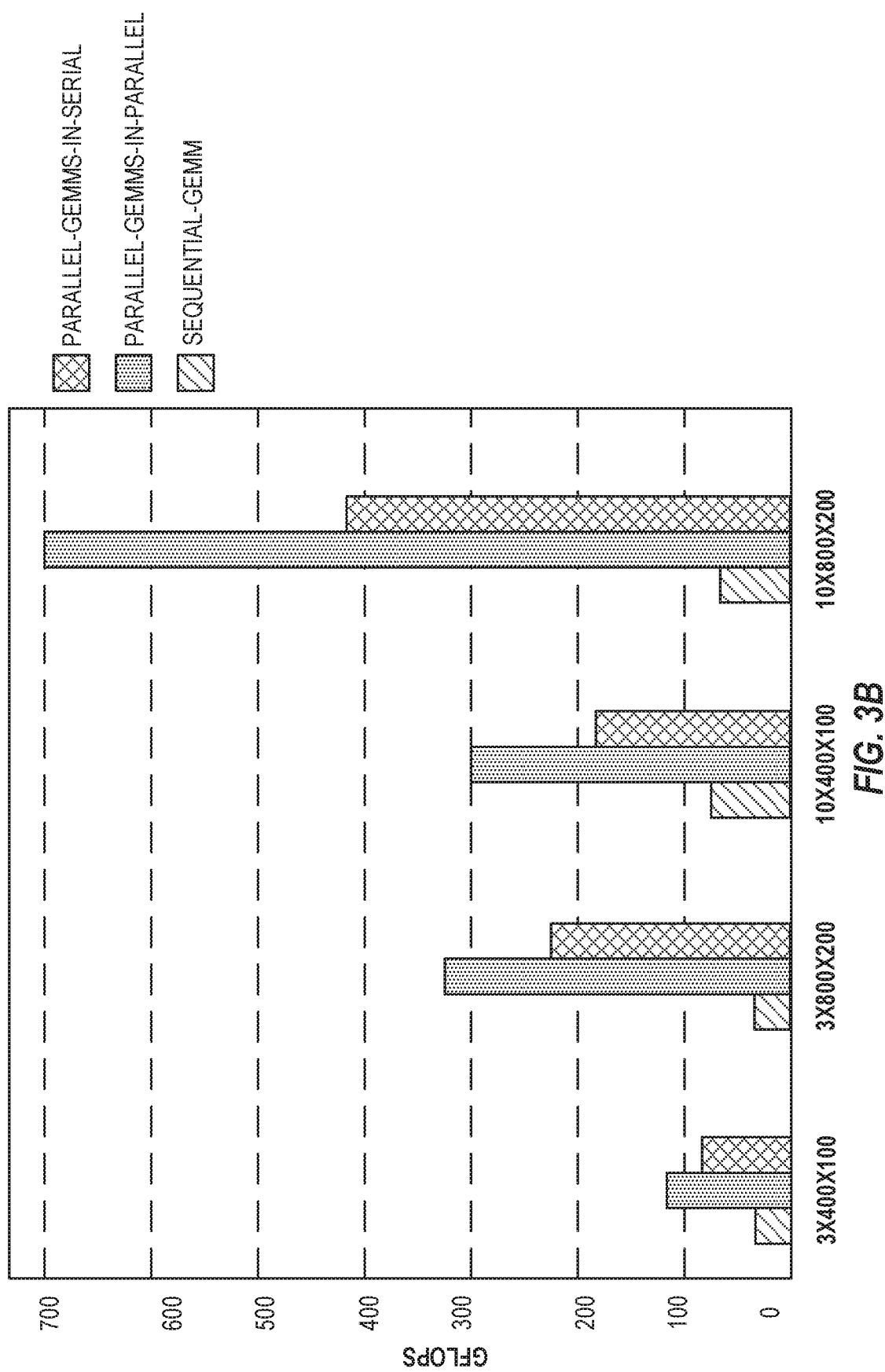
FIG. 3B is a graph of results of Parallel-GEneral Matrix to Matrix Multiplications (GEMMs)-in-Sequence and Parallel-GEMMs-in-Parallel in accordance with respective examples.

Multiple MMs within a phase do not have any dependencies. MMs within a phase may be executed as Parallel-GEMMs-in-Parallel, where multiple MMs are executed concurrently with each MM executing in parallel. For example, to compute two independent MMs, M1 and M2, on P cores, M1 and M2 are run in parallel, each using P/2 cores. This is in contrast with Parallel-GEMMs-in-Sequence, where M1 is run first using P cores followed by M2 using P cores. Parallelizing an MM across multiple cores increases the data movement from L3 to L2 cache. In contrast, executing multiple MMs in parallel across multiple divided groups of cores allows each group to work on a unique MM without requiring data replication, improving data reuse while maintaining the same parallelism level. FIG. 3B shows empirical results of Parallel-GEMMs-in-Sequence and Parallel-GEMMs-in-Parallel. Two independent and identical MMs were ran with increased parallelism and the best performance achieved was reported. Parallel-GEMMs-in-Parallel significantly outperformed Parallel-GEMMs-in-Sequence.

Finding the optimal parallelism degree, via the parallelism generator 208, analytically is non-trivial as it depends on many architectural parameters. Various embodiments apply Parallel-GEMMs-in-Parallel if a phase has multiple fused MMs. The parallelism generator 208 may then use auto-tuning to identify the optimal parallelism for the phase quickly, as the number of cores on a modern multi-core CPU is less than two orders of magnitude and well-known RNN operators such as LSTMs/GRUs have at most two fused MMs per phase.

In various embodiments, the partitioner 210 uses private-cache-aware partitioning (PCP) to execute MMs across multiple cores to optimize L2 cache reuse within and across phases. PCP provides a method to optimize data movement with formal analysis: For a given MM with parallelism degree P, PCP produces a P-partitioning of the computation space such that the total data movement between L3 and L2 caches is minimized. Various embodiments employ PCP to generate a locality-optimized schedule for each parallelism configuration without requiring empirical calibration of different partitions and measuring their performance.

For data reuse within a phase, suppose an MM C[i, j]=$\Sigma_k$ A[i, k]×B[k,j] has P partitions, where $X_i$, $X_j$ and $X_k$ are the number of partitions along each of the i, j, and k dimensions and $X_i \times X_j \times X_k$=P. The total data movement between L3 and L2 cache is derived as a function of the partitions. This data movement depends on the relation between the size of the input and output matrices of the MM and the sizes of the L3 and L2 caches. For all RNNs of interest in a serving scenario, the input matrix is much smaller than an L2 cache, and the sum of all matrices fit in an L3 cache. Under such conditions, that the total data movement between L3 and L2 cache is equal to $X_j|A|+X_i|B|+2X_k|C|$. By choosing $X_i$, $X_j$, and $X_k$ that minimizes this quantity, PCP obtains a parallel partitioning that maximizes data reuse from L2 cache.

In some embodiments, the partitioner 210 may take into consideration identical time-dependent phases (TDPs) across a sequence that have data reuse between them. For each MM in these phases, weight matrices stay the same. In some embodiments, the partitioner 210 exploits the reuse in weights across phases.

Reuse across TDPs effects the total data movement between L3 and L2 caches. For a given P-partitioning strategy ($X_i$, $X_j$, $X_k$), the weight matrix B is divided into blocks of size $$\frac{|B|}{X_j \times X_k}.$$

If the block fits in L2 cache of an individual core, then the block will not be evicted from L2 cache for the entire computation sequence as long as the mapping between the MM partitions and the compute cores does not change. In such cases, denoting the sequence length of RNN as seq_len, the total data-movement is given by:

$$\text{seq\_len} \times (X_j|A| + 2X_k|C|) + X_i|B| \text{ if } \frac{|B|}{X_j * X_k} \leq |L2|; \text{ or}$$

$$\text{seq\_len} \times (X_j|A| + X_i|B| + 2X_k|C|) \text{ if } \frac{|B|}{X_j * X_k} > |L2|.$$

In an embodiment, this piecewise function is minimized to maximize the data reuse across a sequence. In some embodiments, a block of the weight matrices does not fit entirely in L2 cache but is not much larger than L2 cache, e.g., not more than 3%, 5% or 10% larger, such that partial reuse is possible.

The streamliner 212 enables full-fledged PCP, supporting reuse of weight matrices across TDPs. For a given parallelism degree, PCP produces a partitioning such that the weights required to compute the partition fit in the L2 cache of a single core (when possible), allowing weights to be reused from the L2 cache across TDPs, without being evicted from the L2 cache. However, to ensure this reuse, the computation is conducted where the weights are, i.e., the mapping between parallel partitions and the cores that execute them do change across TDPs.

In one implementation, OpenMP was used to create a parallel region that spans across the entire RNN sequence of computation. The parallelism degree is equal to the max parallelism degree among all phases in the schedule. Each thread in the parallel region is responsible for executing at most a single parallel partition during each phase. Some threads may remain idle during phases where the parallelism degree is less than the number of threads. Each thread ID is mapped to a unique partition ID, and this mapping is identical across TDPs. The order of the sequence loop and the parallel region is alternated such that the sequence loop is inside the parallel region, shown as ParallelOuterRNN in TABLE 2, and not the other way as ParallelInnerRNN. By pinning each thread to a unique core using thread affinity settings, a given partition is always executed on the same core across the entire sequence.

TABLE 2

ParallelOuterRNN( intput_sequence, output)
  # pragma omp parallel
    int id = omp_get_thread_num( )
    for t in intput_sequence :
      ComputeRNNOuterParallel( id, t, output)
ParallelInnerRNN( intput_sequence, output)
  for t in intput_sequence :
    # pragma omp parallel
    int id = omp_get_thread_num( )
    ComputeRNNInnerParallel( id , t, output)

Alternating the order of the sequence loop and the parallel region has advantages over creating parallel regions inside the sequence loop, which is what is done in ParallelInnerRN. Alternating allows easy pinning of each MM partition to a particular core across multiple RNN steps. In an example, threads in each parallel region have their local thread IDs starting from 0. A unique mapping between this local thread ID and the global thread ID, therefore, may not be guaranteed across multiple parallel regions separated in time. Known thread affinity settings allow binding global thread IDs to cores or hyperthreads, but not local thread IDS. By creating a single parallel region, a unique mapping between a local thread ID and the global thread ID throughout the computation is created, which ensures that an MM partition is always executed on the same core across the entire sequence. Alternating may also reduce overhead of creating parallel regions. Instead of opening and closing parallel regions during each step of the RNN sequence, a parallel region is created only once for the entire computation.

Figure 3C:
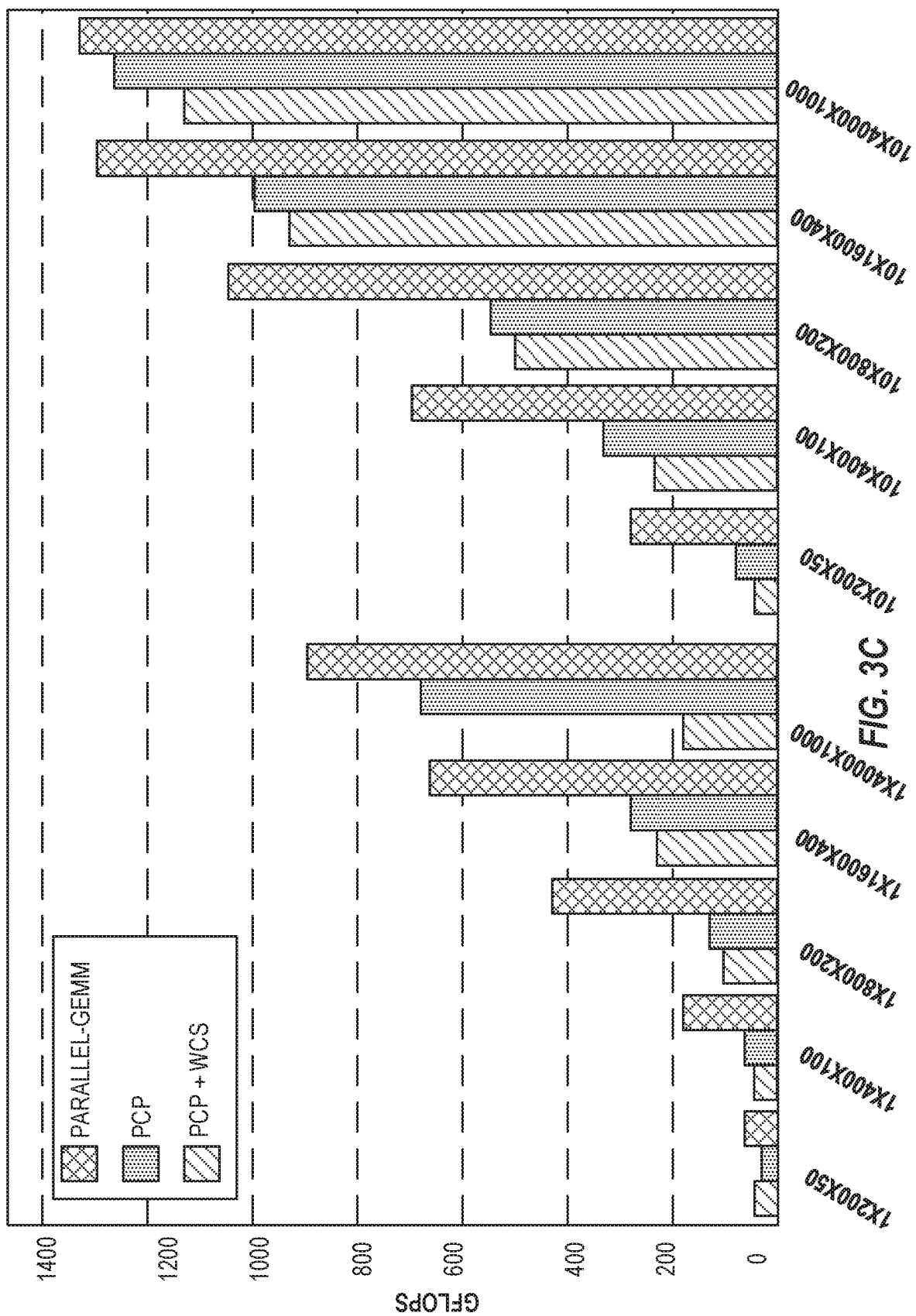
FIG. 3C is a graph of performance of running of sequence with partitioning and streamlining in accordance with respective examples.

FIG. 3C compares performance of running a sequence of parallel-GEMM and partitioning, e.g., PCP, with/without streamlining, e.g., WCS, for varied sizes of MMs. The latter two consistently outperform the former, but a greater benefit of PCP (across phases) is realized when used together with WCS.

Figure 4:
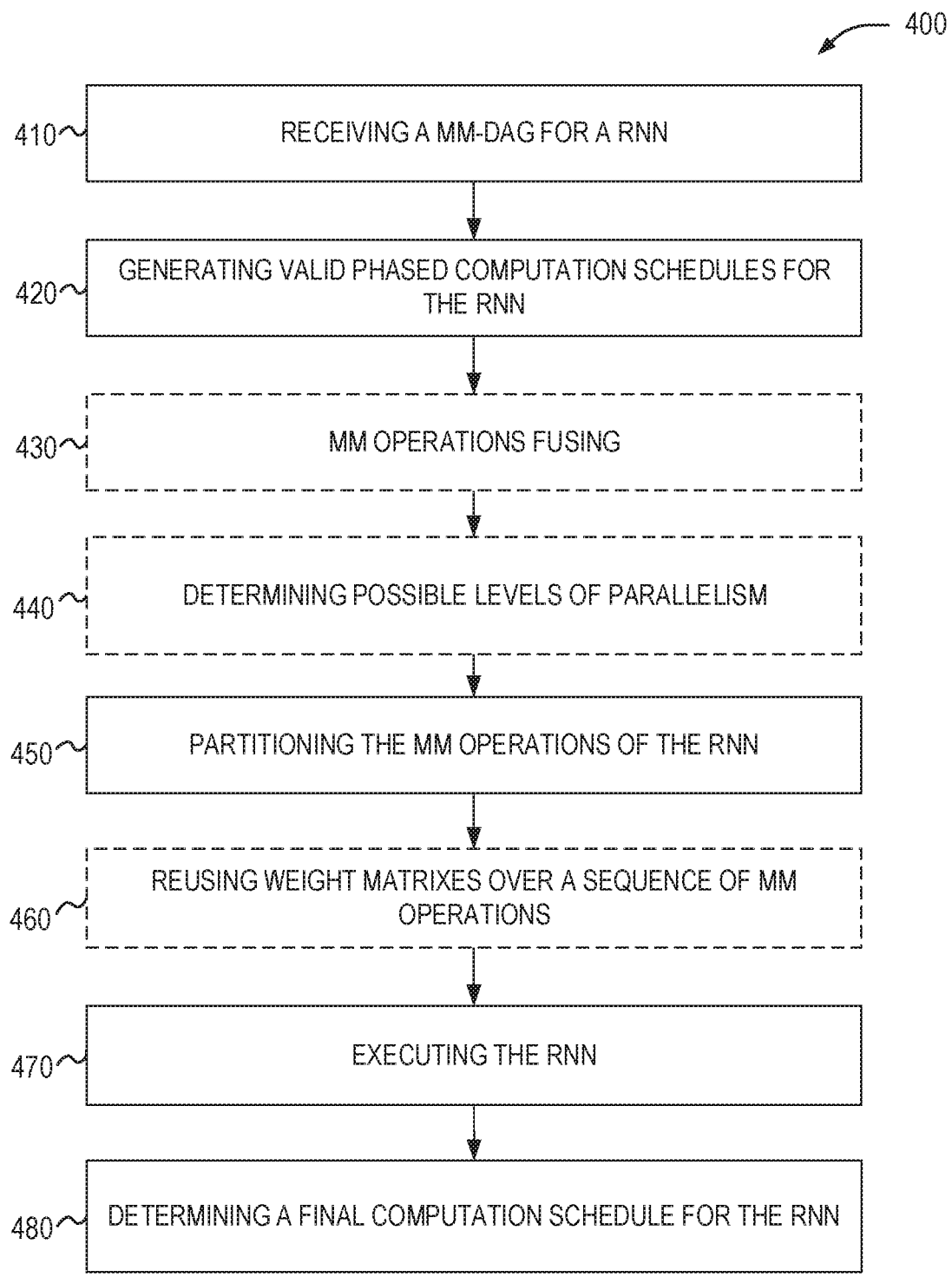
FIG. 4 is a flow diagram of a process for determining a computation schedule for an RNN model in accordance with respective examples.

FIG. 4 is a flow diagram of a process 400 for determining a computation schedule for an RNN model in accordance with respective examples. The process 400 may be implemented on a computing device. At 410, a Directed Acyclic Graph of Matrix Multiplication nodes (MM-DAG) for an RNN is received. The MM-DAG models the RNN computation. Each node in the MM-DAG may represent an MM and edges represent dependencies between MMs. At 420, valid phased computation schedules for the RNN are generated. In an example, a set of schedules is created. In another example, a single schedule is generated and then later additional schedules are generated one-by-one until there are no more schedules to test. Schedules may be generated by the scheduler generator 204 of FIG. 2. A valid phased schedule executes an MM-DAG in sequence based on the dependencies of the MM-DAG. The search space for all possible schedules is very large and may be reduced to speed up search time. In an example, schedules with time-dependent phases at the start may be removed. In this example, only schedules with time-independent phases as the start of the sequence are generated.

At 430, MMs within a phase may be fused together. Fusion is an optional step, as shown by the dashed box, and in some examples MM fusion is not done. Fusion of two MMs may occur when the two MMs share an input matrix. At 440, possible levels of parallelism for a schedule is determined. As the level of parallelism reaches a threshold where further parallelism is not advantageous, the best performing level of parallelism may be determined. This is also an optional step, shown by the dashed box. In an example, MMs within a phase are executed concurrently with each MM executing in parallel.

At 450, the MM operations of the RNN are partitioned for execution across available cores. For example, the cores may be cores within a CPU. In various embodiments, not all available cores are used for a particular phase of the MM-DAG. In an example, the partitioning is done to optimize the L2 cache reuse of a core. For example, the movement between the shared L3 cache to the private L2 cache of a core may be minimized to optimize the L2 cache reuse. At 460, a weight matrix is reused over a sequence of MM options. For time-dependent phases, the weight matrix used for the different phases may be the same. In an example, a sequence of MM operations that share the same weight matrix are portioned to the same core and executed sequentially. This allows the weight matrix to be loaded into the L2 cache of a core for the first time-dependent phase. When the next time-dependent phase executes on the same core, the weight matrix will be in the L2 cache and may be reused. The weight matrix optimization is an optional step, as indicated by the dashed box.

At 470, for each valid phased computation schedule and for each level of parallelism, the RNN is executed. In an example, the execution time for the RNN is recorded. At 480, a final computation schedule is determined for the RNN. The final computation schedule may be stored and used for future instances of the RNN. For example, when the RNN is being served, the RNN may be executed using the final computation schedule. In an example, the final computation schedule is the valid phased computation schedule with the smallest execution time.

Figure 5A:
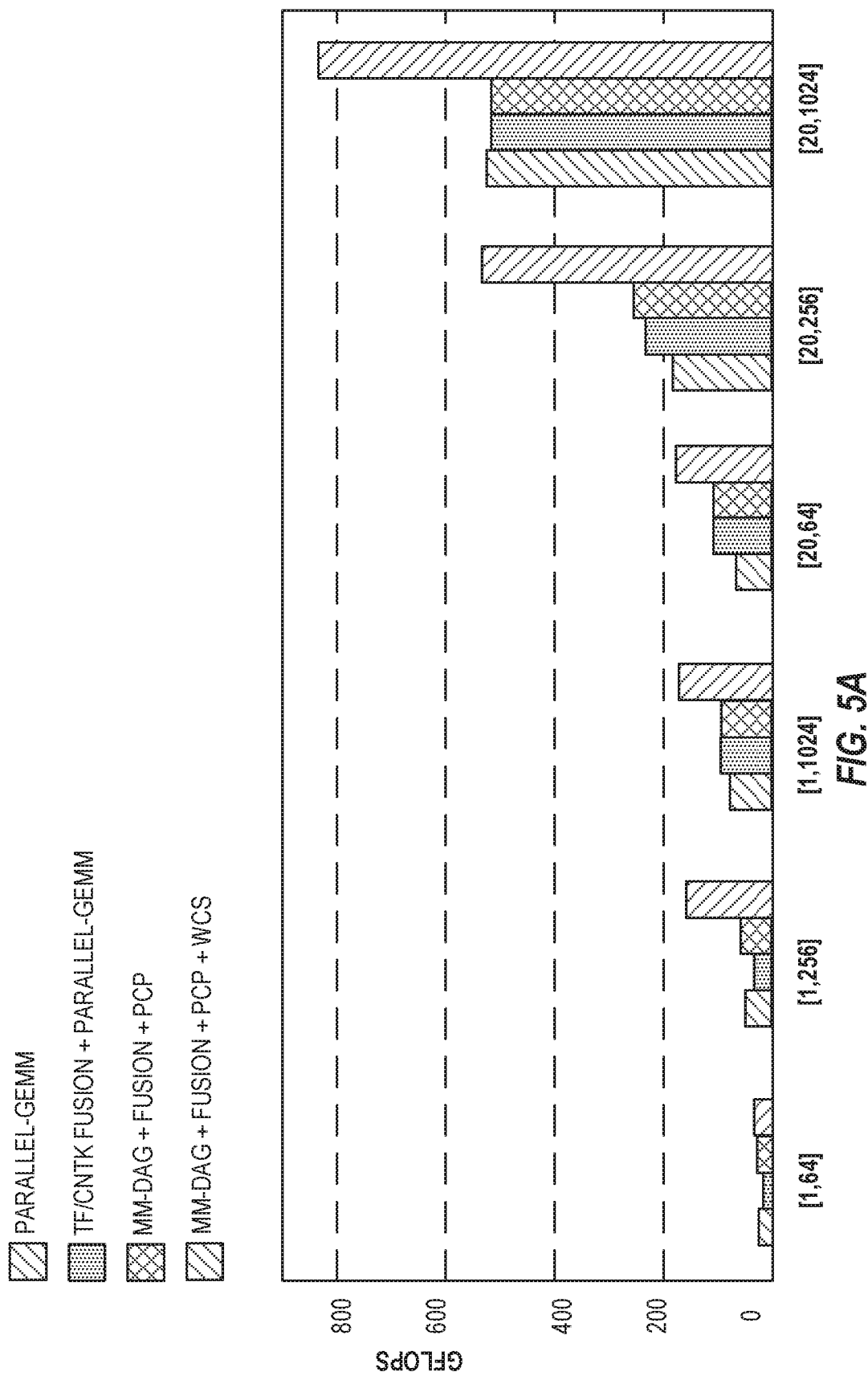
FIG. 5A illustrates the performance of long short term memories (LSTMs) with the four different configurations in accordance with respective examples.

To test the performance, various embodiments and known DL frameworks were run using the same RNN. In one experiment, the baseline was Parallel-GEMM that ran each step of the test LSTM as eight MMs in sequence and each MM was executed with Intel-Math Kernel Library (MKL) parallel-GEMM. The LSTM was run using TensorFlow/Cognitive Toolkit (CNTK) fusion and the fused MM was executed using Intel-MKL parallel-GEMM. An embodiment with MM fusion and private-cache-aware-partition (PCP) and an embodiment with MM fusion, private-cache-aware-partition and weight centric streamlining (WCS) were also run. FIG. 5A illustrates the performance of the LSTMs with the above four configurations. The x-axis shows the [batch size, input/hidden dimensions] for each run of the LSTM.

TensorFlow/CNTK Fusion has roughly the same performance as the baseline. MM-DAG+Fusion+PCP performed as good as or better than both the baseline and TensorFlow/CNTK. MM-DAG+Fusion+PCP applied private-cache-aware partition but did not ensure that MMs sharing same weight input matrices were mapped to the same core. In contrast, MM-DAG+Fusion+PCP+WCS was much faster, particularly for small batch sizes where the reuse is small within a single phase and reused across TDPs is important for better performance. Even for larger batch size with the input/hidden dimension 256 and 1024, where the total size of the weight matrices is larger than the L2 cache but individual weight blocks fit in L2 cache, the tested embodiment offered an increase in performance by enabling reuse of weights across the TDPs.

Figure 5B:
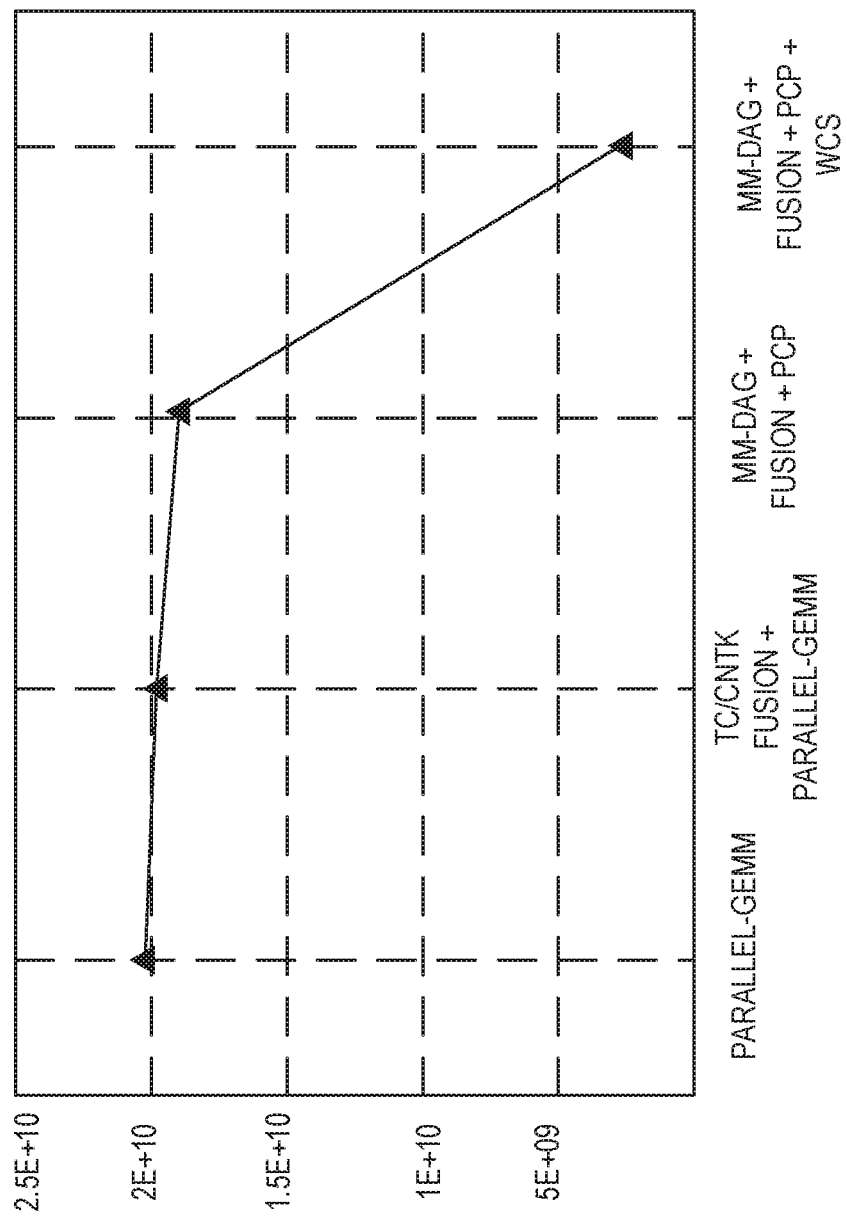
FIG. 5B shows the number of L2 cache misses in accordance with respective examples.

The variable L2_RQSTS.ALL_DEMAND_MISS counter in a third-party amplifier was used to measure data movement between the L3 cache and the L2 cache. FIG. 5B shows that the tested embodiments reduced the number of L2 cache misses, by up to 8×.

The disclosed embodiment found the optimal execution schedule with just a few hundred calibration runs. In the example of LSTM, approximately P×Q configurations were searched by generating P=#cores parallelism choices and Q phased schedules that satisfies the pruning criteria described above. LSTMs, Q<20, may be verified by enumerating the valid schedules. Per parallelism choice, the private-cache-aware-partitioning identified optimized partitioning analytically, e.g., integer programming, without requiring additional empirical exploration, greatly saving search space. This search/calibration process may be called once during model construction, and then the optimized schedule is stored and repeatedly used for serving upcoming user requests.

In another experiment, an embodiment implementing PCP and WCS was tested against other DL frameworks, TensorFlow and CNTK. In addition, a wide range of model parameters were used to simulate a wide range of different configurations. This experiment was ran on a server with two 2.20 GHz Intel Xeon E5-2650 V4 processors, each of which has 12-cores (24 cores in total) with 128 GB RAM, running 64-bit Linux Ubuntu 16.04. The peak Gflops of the CPU is around 1.69 Tflops. The server included one Nvidia GeForce GTX TITAN X which was used for measuring RNN performance on GPU.

An LSTM/GRU was evaluated by varying input dimension, hidden dimension, batch size, and input sequence length to cover a wide range of configurations. TABLES 3A-3B show the execution times and speedups of LSTMs and GPU. The first four columns in both tables describe the specification of RNNs: input dimension, hidden dimension, batch size, and sequence length. Both absolute execution time and speedup are reported. Speedup is measured as the ratio between the execution times of TensorFlow (or CNTK) versus the tested embodiment, e.g., a value of 2 indicates that the embodiment ran 2 times faster. To make reliable measurements, each configuration was run 2,000 times and the average is reported below in TABLES 3A-3B. The results show that the tested embodiment outperformed TensorFlow and CNTK, with speedups in the range of 3.7 to 93 times, and average speedup of 18× among all the tested configurations.

TABLE 3A

| Model parameters | | | | LSTM exec. time (ms) | | | GRU exec. time (ms) | | |
|---|---|---|---|---|---|---|---|---|---|
| Input | Hidden | Batch | Len. | TF | CNTK | Embod. | TF | CNTK | Embod. |
| 64 | 64 | 1 | 100 | 7.3 | 25 | 0.31 | 8 | 25 | 0.7 |
| 256 | 64 | 1 | 100 | 10 | 27 | 0.29 | 9.6 | 26 | 0.58 |
| 1024 | 64 | 1 | 100 | 19 | 25 | 0.42 | 16 | 27 | 0.69 |
| 64 | 256 | 1 | 100 | 21 | 23 | 0.62 | 17 | 30 | 0.79 |
| 64 | 1024 | 1 | 100 | 180 | 30 | 6.5 | 110 | 37 | 6.4 |
| 1024 | 1024 | 1 | 100 | 460 | 33 | 11 | 190 | 40 | 8.4 |
| 256 | 256 | 1 | 1 | 0.96 | 1.1 | 0.069 | 0.89 | 1 | 0.053 |
| 256 | 256 | 1 | 10 | 3.4 | 2.9 | 0.16 | 2.9 | 3.4 | 0.14 |
| 256 | 256 | 1 | 100 | 28 | 21 | 0.74 | 22 | 25 | 09 |
| 64 | 64 | 10 | 100 | 20 | 47 | 1.1 | 18 | 43 | 1.1 |
| 64 | 64 | 20 | 100 | 27 | 74 | 1.5 | 25 | 88 | 1.5 |
| 256 | 256 | 10 | 100 | 51 | 62 | 4.4 | 34 | 66 | 3.7 |
| 256 | 256 | 20 | 100 | 58 | 91 | 6.4 | 51 | 100 | 5.4 |
| 1024 | 1024 | 10 | 100 | 400 | 180 | 42 | 280 | 170 | 36 |
| 1024 | 1024 | 20 | 100 | 540 | 250 | 68 | 380 | 230 | 60 |

TABLE 3B

| Model parameters | | | | LSTM speedup | | GRU speedup | |
|---|---|---|---|---|---|---|---|
| Input | Hidden | Batch | Len. | TF | CNTK | TF | CNTK |
| 64 | 64 | 1 | 100 | 26 | 81 | 11 | 36 |
| 256 | 64 | 1 | 100 | 34 | 93 | 17 | 45 |
| 1024 | 64 | 1 | 100 | 45 | 60 | 23 | 39 |
| 64 | 256 | 1 | 100 | 34 | 37 | 22 | 38 |
| 64 | 1024 | 1 | 100 | 28 | 4.6 | 17 | 5.8 |
| 1024 | 1024 | 1 | 100 | 42 | 3 | 23 | 4..8 |
| 256 | 256 | 1 | 1 | 14 | 16 | 17 | 19 |
| 256 | 256 | 1 | 10 | 21 | 18 | 21 | 24 |
| 256 | 256 | 1 | 100 | 38 | 28 | 24 | 28 |
| 64 | 64 | 10 | 100 | 18 | 43 | 16 | 39 |
| 64 | 64 | 20 | 100 | 18 | 49 | 17 | 59 |
| 256 | 256 | 10 | 100 | 12 | 14 | 9.2 | 18 |
| 256 | 256 | 20 | 100 | 9.1 | 14 | 9.4 | 19 |
| 1024 | 1024 | 10 | 100 | 9.5 | 4.3 | 7.8 | 4.7 |
| 1024 | 1024 | 20 | 100 | 7.9 | 3.7 | 6.3 | 3.8 |

As another experiment, an embodiment was used to convert current real-world DL models: a text similarity model; an attention sum reader model; and a bidirectional attention flow model. In all three real-world DL models, the embodiment significantly reduced the execution time. In some cases, execution time was reduced from 127 ms to 5 ms. Besides latency, the embodiment was also able to achievement more than a 60× throughput gain over the original DL model.

Figure 6:
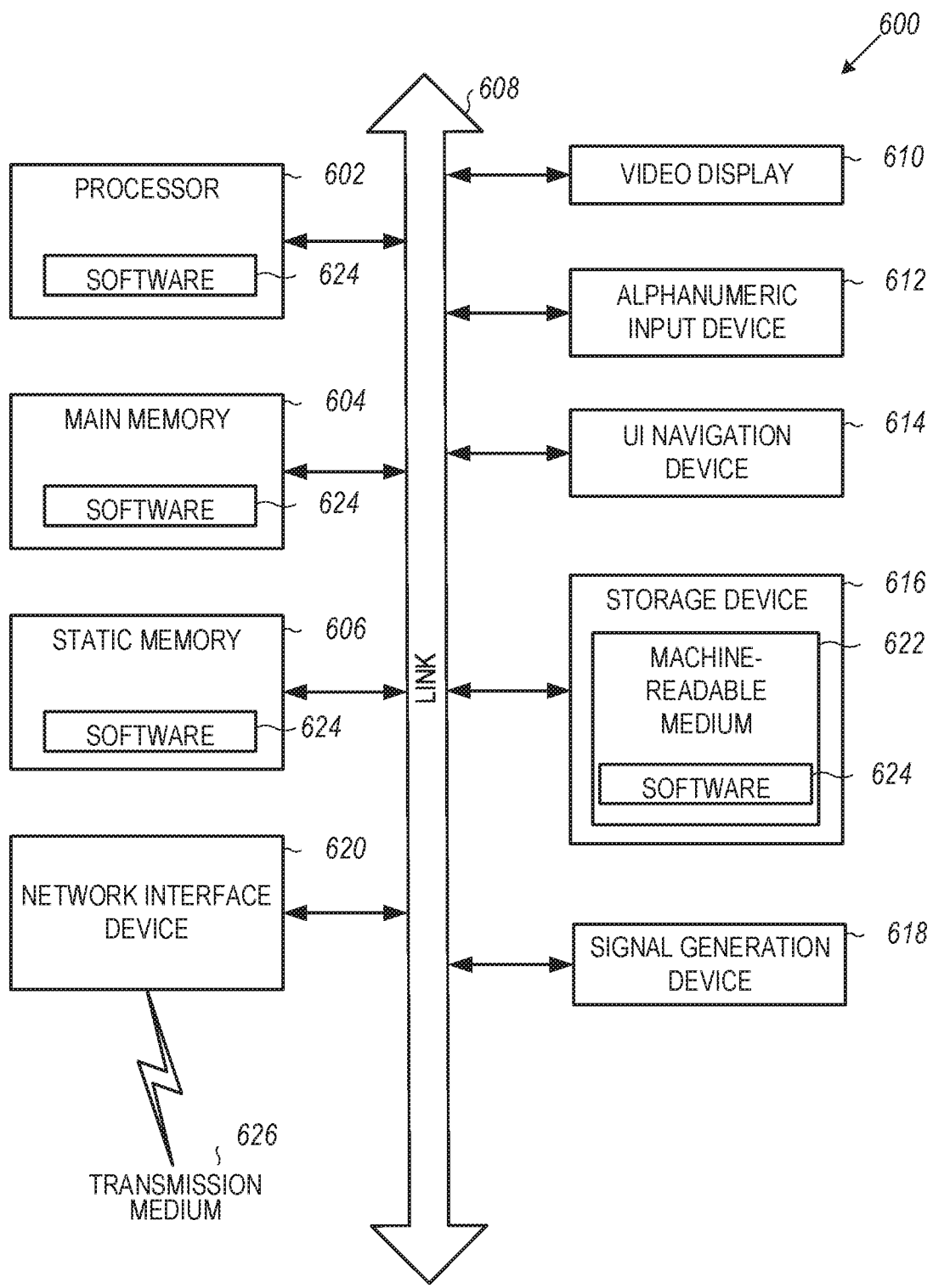
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may implement the schedule generator 204, MM-fusion 206, parallelism generator 208, partitioner 210, streamliner 212, and perform the method of FIG. 4.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors 621, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for determining a computation schedule for a recurrent neural network (RNN), the method comprising:
    receiving a matrix multiplication (MM) directed-acyclic graph (DAG) data structure constructed to model computations of the RNN, the DAG having nodes and edges, with each node representing an MM and each edge representing a dependency between the MMs;
    generating a plurality of valid phased computation schedules for the RNN from the MM-DAG, wherein each of the valid phase computation schedules includes an ordering of MM operations, and wherein the plurality of valid phased computation schedules have been pruned based on time dependencies to retain valid phased computation schedules that increase reuse of weights;
    partitioning, for each of the plurality of valid phased computation schedules, each of the MM operations to a plurality of processor cores based on L3 cache to L2 cache data movement to increase reuse of weights by minimizing data movement between caches;
    executing, for each of the plurality of valid phased computation schedules, the RNN based on the partitioning; and
    storing a final computation schedule based on the executing, wherein the final computation schedule is used for subsequent executions of the RNN, and wherein the plurality of valid phased computation schedules comprises the final computation schedule.

2. The method of claim 1, wherein generating a plurality of valid phased computation schedules for the RNN comprises generating schedules with time-independent phases before time-dependent phases.

3. The method of claim 1, wherein the partitioning further comprises mapping a partition of an MM operation to a single processor core, wherein a weight matrix is reused over a sequence of MM operations, wherein the partition of the MM operation is part of the sequence of MM operations, and wherein a part of the weight matrix is stored in an L2 cache of the single processor core.

4. The method of claim 3, further comprising:
determining two MM operations in a phase have a shared input matrix; and
fusing the two MM operations into a single MM operation.

5. The method of claim 4, further comprising determining a plurality of parallelism degrees for multiple MM operations in a first phase for a first phased computation schedule, wherein the first phase computation schedule is executed with each of the plurality of parallelism levels.

6. The method of claim 5, wherein a selected degree of parallelism is less than the number of the plurality of processor cores.

7. The method of claim 1, wherein the partitioning minimizes total data movement from an L3 cache to an L2 cache of a processor core for the computations of the RNN.

8. The method of claim 1, further comprising:
receiving a request to execute the RNN; and
executing the RNN with the final computation schedule.

9. The method of claim 1, further comprising determining the fastest executing valid phase computation schedule based on the executing, wherein the fastest executing valid phase computation schedule is the final computation schedule.

10. A system for determining a computation schedule for a recurrent neural network (RNN), the system comprising:
an electronic processor configured:
receive a matrix multiplication (MM) directed-acyclic graph (DAG) data structure constructed to model computations of the RNN, the DAG having nodes and edges, with each node representing an MM and each edge representing a dependency between the MMs;
generate a plurality of valid phased computation schedules for the RNN from the MM-DAG, wherein each of the valid phase computation schedules includes an ordering of MM operations, and wherein the plurality of valid phased computation schedules have been pruned based on time dependencies to retain valid phased computation schedules that increase reuse of weights;
partition, for each of the plurality of valid phased computation schedules, each of the MM operations to a plurality of processor cores based on L3 cache to L2 cache data movement to increase reuse of weights by minimizing data movement between caches;
cause execution, for each of the plurality of valid phased computation schedules, of the RNN based on the partitioning; and
store a final computation schedule based on the execution, wherein the final computation schedule is used for future executions of the RNN, and wherein the plurality of valid phased computation schedules comprises the final computation schedule.

11. The system of claim 10, wherein to generate a plurality of valid phased computation schedules for the RNN the electronic processor is configured to generate schedules with time-independent phases before time-dependent phases.

12. The system of claim 10, wherein to partition the electronic processor is further configured to map a partition of an MINI operation to a single processor core, wherein a weight matrix is reused over a sequence of MINI operations, wherein the partition of the MINI operation is part of the sequence of MINI operations, and wherein a part of the weight matrix is stored in an L2 cache of the single processor core.

13. The system of claim 12, wherein the electronic processor is further configured to:
determine two MM operations in a phase have a shared input matrix; and
fuse the two MINI operations into a single MM operation.

14. The system of claim 13, wherein the electronic processor is further configured to determine a plurality of parallelism degrees for multiple MM operations in a first phase for a first phased computation schedule, wherein the first phase computation schedule is executed with each of the plurality of parallelism levels.

15. The system of claim 14, wherein a selected degree of parallelism is less than the number of the plurality of processor cores.

16. A non-transitory computer-readable storage medium storing computer-executable instructions for determining a computation schedule for a recurrent neural network (RNN), the stored instructions comprising:
instructions to receive a matrix multiplication (MM) directed-acyclic graph (DAG) data structure constructed to model computations of the RNN, the DAG having nodes and edges, with each node representing an MM and each edge representing a dependency between the MMs;
instructions to generate a plurality of valid phased computation schedules for the RNN from the MM-DAG, wherein each of the valid phase computation schedules includes an ordering of MM operations, and wherein the plurality of valid phased computation schedules have been pruned based on time dependencies to retain valid phased computation schedules that increase reuse of weights;
instructions to partition, for each of the plurality of valid phased computation schedules, each of the MM operations to a plurality of processor cores based on L3 cache to L2 cache data movement to increase reuse of weights by minimizing data movement between caches;
instructions to execute, for each of the plurality of valid phased computation schedules, the RNN based on the partitioning; and
instructions to store a final computation schedule based on the executing, wherein the final computation schedule is used for future executions of the RNN, and wherein the plurality of valid phased computation schedules comprises the final computation schedule.

17. The non-transitory computer-readable storage medium of claim 16, wherein the instructions to generate a plurality of valid phased computation schedules for the RNN comprise instructions to generate schedules with time-independent phases before time-dependent phases.

18. The non-transitory computer-readable storage medium of claim 16, wherein the instructions to partition comprise instructions to map a partition of an MM operation to a single processor core, wherein a weight matrix is reused over a sequence of MM operations, wherein the partition of the MM operation is part of the sequence of MM operations, and wherein a part of the weight matrix is stored in an L2 cache of the single processor core.

19. The non-transitory computer-readable storage medium of claim 18, wherein the stored instructions further comprise:
instructions to determine two MM operations in a phase have a shared input matrix; and instructions to fuse the two MM operations into a single MM operation.

20. The non-transitory computer-readable storage medium of claim 19, wherein the stored instructions further comprise instructions to determine a plurality of parallelism degrees for multiple MM operations in a first phase for a first phased computation schedule, wherein the first phase computation schedule is executed with each of the plurality of parallelism levels.

\* \* \* \* \*